United States Patent
Yang

(10) Patent No.: US 12,238,557 B1
(45) Date of Patent: Feb. 25, 2025

(54) WIRELESS COMMUNICATION METHOD AND DEVICE THEREOF

(71) Applicant: TP-LINK CORPORATION PTE. LTD., Singapore (SG)

(72) Inventor: Xuxiang Yang, Shenzhen (CN)

(73) Assignee: TP-LINK CORPORATION PTE. LTD., Singapore (SG)

( * ) Notice: Subject to any disclaimer, the term of this patent is extended or adjusted under 35 U.S.C. 154(b) by 0 days.

(21) Appl. No.: 18/434,971

(22) Filed: Feb. 7, 2024

(51) Int. Cl.
H04W 24/08 (2009.01)
H04W 80/12 (2009.01)
H04W 88/16 (2009.01)

(52) U.S. Cl.
CPC ............ *H04W 24/08* (2013.01); *H04W 80/12* (2013.01); *H04W 88/16* (2013.01)

(58) Field of Classification Search
CPC ...... H04W 24/08; H04W 80/12; H04W 88/16
See application file for complete search history.

(56) References Cited

U.S. PATENT DOCUMENTS

2009/0241167 A1* 9/2009 Moore ............... H04L 61/4511
726/1

FOREIGN PATENT DOCUMENTS

| CN | 101146063 A | | 3/2008 | |
|----|----|----|----|----|
| CN | 104506664 A | | 4/2015 | |
| CN | 113194009 A | * | 7/2021 | |
| CN | 108924274 B | | 10/2021 | |
| CN | 116781564 A | * | 9/2023 | |
| EP | 3273666 A1 | * | 1/2018 | ......... H04L 61/2015 |
| TW | I795619 B | | 3/2023 | |

* cited by examiner

*Primary Examiner* — Ayanah S George
(74) *Attorney, Agent, or Firm* — Loeb & Loeb LLP

(57) ABSTRACT

The disclosure provides a method for wireless communication performed by gateway device, a gateway device and a computer-readable storage medium. The method for wireless communication performed by gateway device, includes: performing network state detection; determining a network state based on a result of network state detection; receiving a network request of application layer; and transmitting a network response of the application layer based on the network state.

17 Claims, 6 Drawing Sheets

WIRELESS COMMUNICATION METHOD AND DEVICE THEREOF

TECHNICAL FIELD

The invention relates to the technical field of wireless communication, in particular to a method for wireless communication performed by gateway device, a gateway device, an electronic device, and computer-readable storage medium.

BACKGROUND

Local area networks (LANs) and wireless local area networks (WLANs) are important components of modern communication systems. A LAN utilizes cabling to connect various devices within a local area such as a home or office building, enabling networked communication. A WLAN utilizes wireless technology such as Wi-Fi to connect devices, providing more flexibility and mobility. Both LANs and WLANs require gateway devices like routers and access points to bridge connections between the local network and the wide area network. Having robust LANs, WLANs, and gateways is critical for fast, reliable, and secure communication and data access. However, WLAN systems may encounter malfunctions during operation from diverse causes including hardware/software failures in access points or network configuration errors on the WAN side. These malfunctions can disrupt LAN functionality and degrade user experience. Fault detection on the WAN side and reporting mechanisms on the LAN side need to be improved.

SUMMARY

According to an aspect of the present application, a method for wireless communication performed by gateway device is provided. The method may comprise: performing network state detection; determining a network state based on the result of network state detection; receiving a network request of application layer; and transmitting a network response of the application layer based on the network state.

According to another aspect of the present application, a gateway device for wireless communication, comprising: a memory; and one or more processors operatively coupled to the memory, the one or more processors configured to: perform network state detection; determine a network state based on the result of network state detection; receive a network request of application layer; and transmit a network response of the application layer based on the network state.

According to another aspect of present application, an electronic device is provided, which comprises: a processor, and a memory having stored there on computer programs which, when executed by the processor, cause the processor to perform the above method.

According to another aspect of present application, a computer-readable storage medium is provided, which has stored thereon computer programs which, when executed by the processor, cause the processor to perform: performing network state detection; determining a network state based on a result of network state detection; receiving a network request of application layer; and transmitting a network response of the application layer based on the network state.

BRIEF DESCRIPTION OF DRAWINGS

In order to more clearly explain the embodiments of present application or the technical solution in the prior art, the drawings needed to be used in the description of the embodiments of present application or the prior art will be briefly introduced below. Obviously, the drawings in the following description are only some embodiments recorded in present application, and other drawings can be obtained according to these drawings of the embodiments of present application for those skilled in the art.

DETAILED DESCRIPTION

Figure 1:
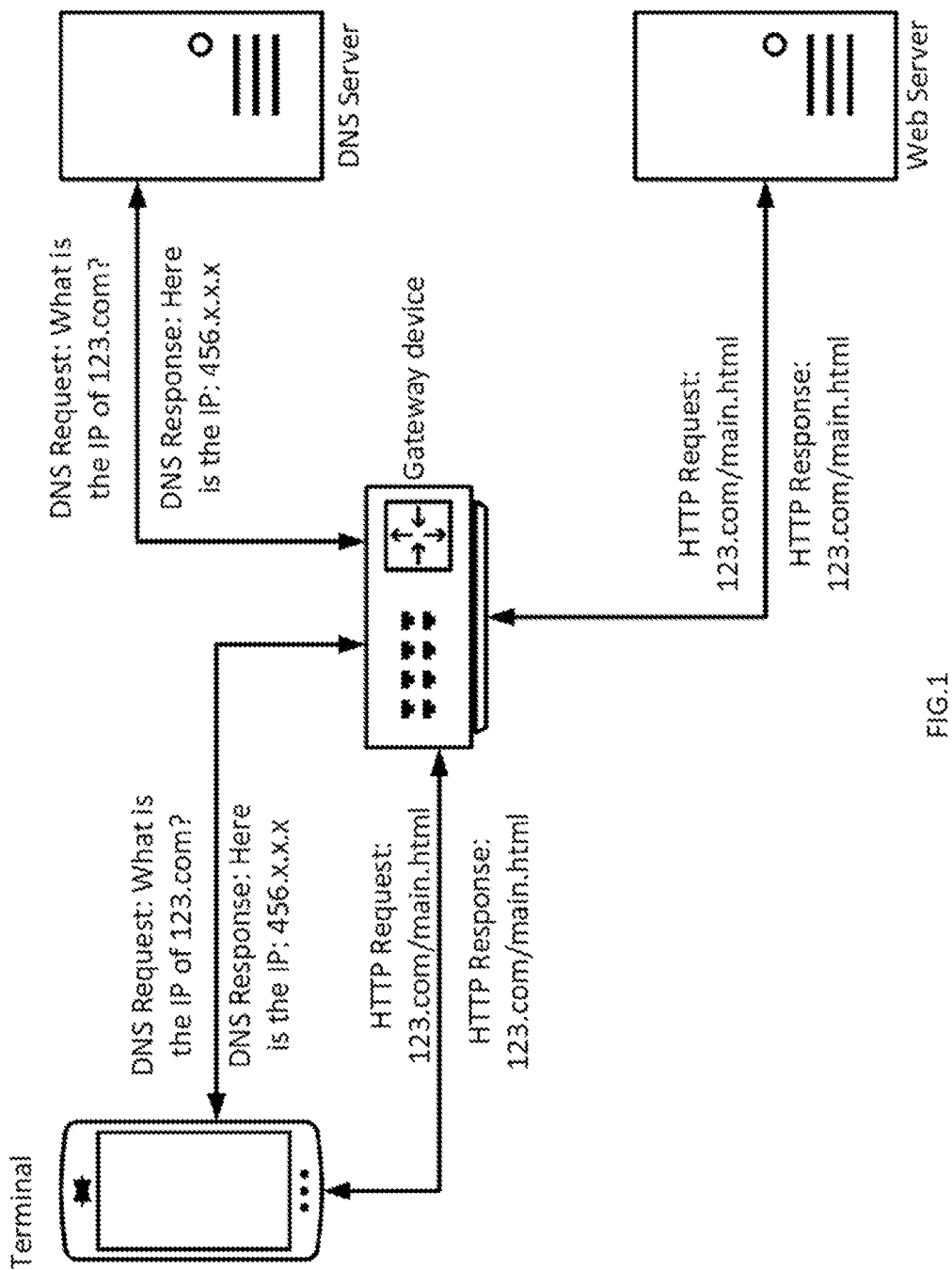
FIG. 1 illustrates a schematic diagram of a network system according to an embodiment of present application.

In order to provide a clearer and more complete description of the purpose, technical solution, and advantages of the present disclosure, the following description, in conjunction with the accompanying drawings, will provide a clear and comprehensive understanding of the technical solution in the present disclosure. It should be noted that the described embodiments are only a part of the embodiments disclosed herein, and not the entire embodiments. All other embodiments that ordinary skilled persons in the art can obtain without exercising inventive labor based on the embodiments disclosed herein are within the scope of the present disclosure.

The terms "first," "second," "third," "fourth," etc. (if present) used in the specification and claims, as well as in the accompanying drawings, are used to distinguish similar objects and are not necessarily used to describe a specific order or sequence. It should be understood that the use of such data can be interchangeable in appropriate circumstances, so that the embodiments of the present disclosure described herein can be implemented in an order other than that shown or described here.

It should be understood that the numbering of the processes in various embodiments of the present disclosure does not imply a specific order of execution. The execution order of the processes should be determined based on their functionality and inherent logic, and should not impose any limitations on the implementation process of the embodiments of the present disclosure.

It should be understood that the terms "comprising" and "having" and their variations intend to cover non-exclusive inclusion, such as a process, method, system, product, or apparatus that includes a series of steps or units, not necessarily limited to those explicitly listed, but may include other steps or units that are inherently present in these processes, methods, products, or apparatus.

It should be understood that the term "multiple" means two or more. The term "and/or" is merely a description of the associated relationship between related objects, indicating that there can be three possible relationships. For example, "A and/or B" can mean: A exists alone, A and B exist simultaneously, or B exists alone. The character "/" generally indicates an "or" relationship between the preceding and following related objects. "Including A, B, and C," "including A, B, C" means that A, B, and C are all included, and "including A, B, or C" means that one of A, B, and C is included. "Including A, B and/or C" means that any one or two or all three of A, B, and C are included.

It should be understood that "corresponding to B with A," "corresponding to A with B," "A corresponds to B," or "B corresponds to A" means that B is associated with A and can be determined based on A. Determining B based on A does not mean that B can only be determined based on A, but can also be determined based on A and/or other information. The matching of A and B means that the similarity between A and B is greater than or equal to a predetermined threshold.

Depending on the context, the term "if" used herein can be interpreted as "when" or "in response to determining" or "in response to detecting."

The following specific embodiments will provide a detailed description of the technical solution of the present disclosure. These specific embodiments can be combined with each other, and certain concepts or processes may not be reiterated At Some embodiments if they are the same or similar. In order to provide a clearer understanding of the purpose, technical solution, and advantages of the present disclosure, the following description will be provided in conjunction with the accompanying drawings.

Currently, there are two primary methods for assessing network status by a terminal. The first involves proactive detection using the NCSI protocol. The second occurs when accessing the internet via a browser, where the terminal independently evaluates the network environment. This involves utilizing the acquired IP and DNS addresses to perform DNS resolution and subsequently conducting HTTP access based on the resolution results. In these two methods, the gateway device only forwards the message. The terminal needs to determine the network status by its own.

Terminals, such as personal computers, typically assess network status by analyzing network packets. This process is triggered only when terminals gain access to the internet. If a network problem arises during this period, the terminal must wait for DNS resolution or HTTP access timeouts to recognize the abnormal status. This method requires a considerable amount of time for the terminal to conclusively identify anomalies, for instance, waiting for predefined timeout events. Additionally, terminals cannot pinpoint the specific cause of the anomaly.

Thus, fault detection and reporting mechanisms in WLAN systems need to be improved.

The present disclosure provides a network state detection and feedback mechanism based on gateway device. In this present disclosure, the gateway device is equipped to identify the current network state. When the gateway device detects an abnormal network status and is unable to provide normal network access functionality for the LAN-side terminals, it communicates the existing abnormal state back to the LAN-side terminals in an efficient way.

In the following sections, the present application will provide a more detailed description of the present disclosure, with reference to FIGS. 1-6

FIG. 1 illustrates a schematic diagram of a network system according to an embodiment of the present application.

As depicted in FIG. 1, the network system according to the embodiment comprises four or more devices: terminals, a gateway device, a DNS (Domain Name System) server, and a web server. Terminals refer to end-user devices that access the network, including laptops, smartphones, or tablets. The gateway device functions as a bridge connecting the local network to the internet. It receives requests from terminals and directs them to their respective destinations. The DNS server plays a role in translating human-readable domain names (e.g., 123. com) into numerical IP addresses (e.g. 456.x.x), facilitating the location of web servers by computers. Lastly, the web server is responsible for storing and delivering web content (e.g., HTML files, images) to devices making HTTP (Hypertext Transfer Protocol) requests.

In the DNS request process, the user initiates the process by entering a website's domain name into their browser on the terminal. The terminal then sends a DNS request to the gateway device, which, in turn, queries the DNS server if the local IP address for the specified website is unavailable in its cache. Upon receiving the DNS response from the DNS server, indicating the IP address (e.g., 456.x.x), the gateway device forwards this information back to the terminal for further processing. The present disclosure is not limited thereto.

In the HTTP request process, the terminal initiates a connection by utilizing the received IP address to establish communication with the web server. Subsequently, the terminal dispatches an HTTP request message to the web server, specifying the desired webpage or resource (e.g. 123.com/main.html). The web server, upon receipt of the request, undertakes the necessary processing to locate and retrieve the requested content. Following this, the web server formulates and sends an HTTP response message containing the requested content back to the terminal. Upon receiving the response, the terminal parses the content and proceeds to display the webpage or resource for the user. The present disclosure is not limited thereto.

The shown examples of DNS request and HTTP request serve only as illustrations of application layer network requests, while the shown examples of DNS response and HTTP response serve only as illustrations of application layer network responses. The scope of the present disclosure extends beyond these specific examples.

In traditional scenarios, when the gateway device loses connection with either the DNS server or the Web Server, or when the gateway device is temporarily non-operational due to software or hardware issues, terminals may be compelled to wait for timeouts to determine abnormalities of network status. This extended waiting period is deemed a compromise to the efficiency of network operations.

The present disclosure provides a network state detection and feedback mechanism based on gateway device. In this present disclosure, the gateway device is equipped to identify the current network state. When the gateway device detects an abnormal network status and is unable to provide normal network access functionality for the LAN-side terminals, it communicates the existing abnormal state back to the LAN-side terminals in an efficient way.

Figure 2:
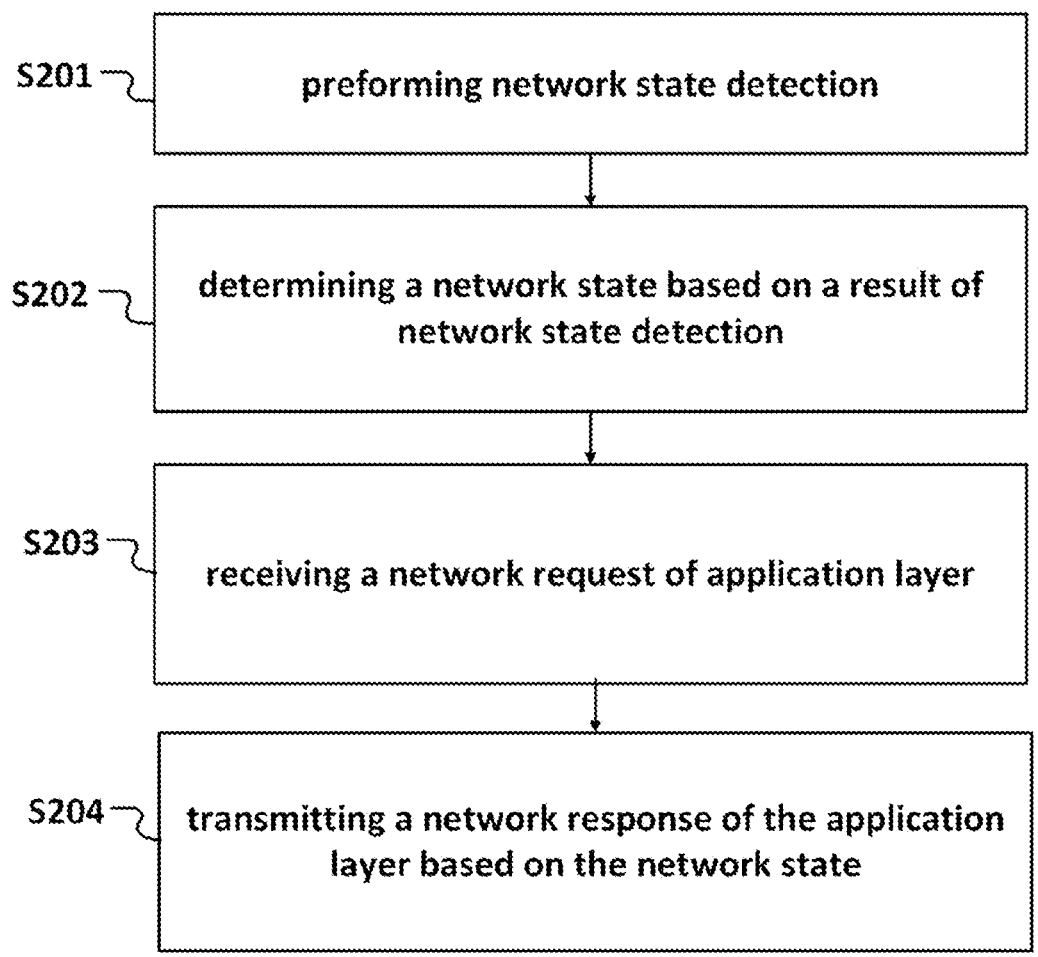
FIG. 2 illustrates a flowchart of the method for wireless communication performed by gateway device according to an embodiment of the present application.

FIG. 2 illustrates a flowchart of method 20 for wireless communication performed by a gateway device according to an embodiment of the present application.

The method for wireless communication includes step S201 to step S204.

At S201, network state detection is performed.

Optionally, network state detection refers to the process of actively monitoring and evaluating the status and performance of the network system as described in FIG. 1. It involves measuring various network parameters to identify potential issues or abnormalities. Network state detection mechanisms are designed to monitor network parameters including but not limited to: broadband access status, connection dial-up status, DNS server reachability, connectivity to default gateways, and custom defined exceptions.

Optionally, at S201, a measurement for at least one network parameter is performed by the gateway device, and the result of network state detection is determined based on the measurement.

Optionally, the measurements can be categorized into two types: passive measurements and active measurements. Passive measurements are triggered by sudden changes in status, based on what the gateway device can naturally perceive, such as sudden changes in broadband access status or dialing status. On the other hand, active measurements involve the gateway device proactively initiating status inquiries, for instance, checking DNS status and default gateway status periodically. By combining both passive and active measurements, the gateway device can continuously acquire real-time information related to the current network state.

At S202, a network state is determined based on a result of network state detection.

Based on the data gathered through the measurement at S201, the gateway device can assess whether it is experiencing an abnormal network state and classify the abnormality. The gateway device will then log the current status information for reference. The present disclosure is not limited thereto.

For example, if the result of network state detection indicates that the broadband access status is either disconnected or connection failure, the network state is determined as abnormal. Similarly, if the result of network state detection indicates that the dialing status is disabled or disconnected, the network state is determined as abnormal. The present disclosure is not limited thereto.

For example, if the result of network state detection indicates that the DNS server is not reachable, the network state is determined as abnormal. Similarly, if the result of network state detection indicates that the default gateway is not connected, the network state is determined as abnormal. The present disclosure is not limited thereto.

Additionally, it is possible to customize exceptional scenarios based on specific requirements. The gateway device will then monitor the status of these custom-defined exceptional situations and maintain a record of their occurrences. The present disclosure is not limited thereto.

At S203, a network request of application layer is received.

Optionally, a network request of the application layer transmitted by a LAN-side terminal to the gateway device refers to a communication initiated by an application or software at the highest layer of the OSI model, i.e. the application layer. This request typically involves the exchange of data between software applications running on different devices within a network. In the context of the internet, for example, network requests of application layer include DNS requests, which translate human-readable domain names into IP addresses, and HTTP requests, used for retrieving web pages and related content from web servers. The present disclosure is not limited thereto.

Optionally, LAN-side terminals refer to end-user devices or networked devices that are connected to the Local Area Network (LAN). These devices, as shown in FIG. 1, typically include computers, laptops, smartphones, tablets, printers, and other networked appliances within a specific localized area, such as a home, office, or campus. The LAN-side terminals communicate with each other and with the LAN's internal devices, which may include servers, routers, and other networking equipment. The term "LAN-side" distinguishes these devices as being part of the local network, as opposed to devices or servers on the external or wide-area network. The present disclosure is not limited thereto.

At S204, a network response of the application layer is transmitted based on the network state.

Optionally, in response to the network status being determined as normal, the gateway forwards the response from DNS server or web server normally as described in FIG. 1, such as DNS response and HTTP response.

However, in response to the network status being determined as abnormal, the gateway transmits the network response of the application layer from a pseudo server of the gateway device. The gateway would act as a pseudo DNS server or a pseudo web server, create a network response of the application layer, and then transmit the network response of the application layer to the terminal. Optionally, the network response of the application layer includes an indicator of abnormal network status, and indicates at least one of: broadband access status being disconnected, connection dial-up status being disconnected, DNS server being unreachable, or a failure in default gateway. The present disclosure is not limited thereto.

Optionally, at S204, in response to the network status transitioning from a normal state to an abnormal state, the gateway device creates an instance of pseudo server; deploys redirect rules (which also referred as filtering rules or firewall rules) for redirecting the network request of application layer to the pseudo server; and transmits the network response of the application layer from a pseudo server of the gateway device. More specifically, the gateway device parses the network request of the application layer, and determines a type of the network request of the application layer. In response to the type of the network request of the application layer being HTTP GET/POST message, the gateway device transmits a HTTP response with indicator of abnormal network status. In response to the type of the network request of the application layer being DNS request, the gateway device transmits a DNS response with IP address of the pseudo server. The present disclosure is not limited thereto.

However, in response to the network status transitioning from an abnormal state to a normal state, the gateway device deletes an instance of pseudo server; deleting the routing rules for redirecting the network request of application layer to the instance of pseudo server; and forwards the network response of the application layer from a DNS server or a web server. The present disclosure is not limited thereto.

The present disclosure provides a network state detection and feedback mechanism based on gateway device. In this present disclosure, the gateway device is equipped to identify the current network state. When the gateway device detects an abnormal network status and is unable to provide normal network access functionality for the LAN-side terminals, it communicates the existing abnormal state back to the LAN-side terminals in an efficient way.

Next, some details of the gateway device 30 of the present disclosure will be described with reference to FIGS. 3 to 5. The gateway device 30 may be used to implement the method 20 according to an embodiment of the present disclosure. The present disclosure is not limited thereto.

Figure 3:
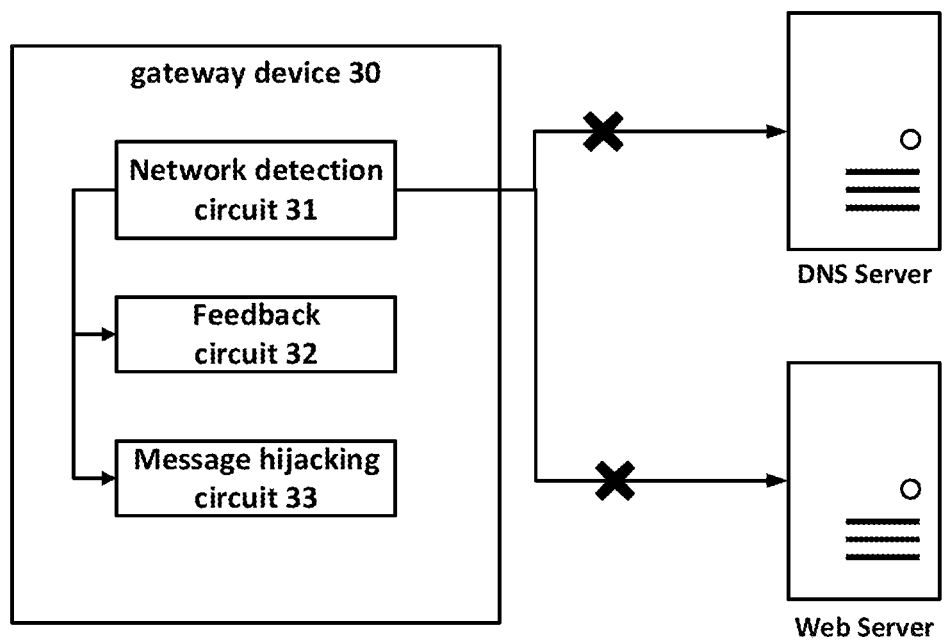
FIG. 3 illustrates a schematic diagram of the gateway device according to an embodiment of the present application.

FIG. 3 illustrates a schematic diagram of the gateway device 30 according to an embodiment of the present application. FIG. 4 illustrates another schematic diagram of the gateway device 30 according to an embodiment of the present application. FIG. 5 illustrates another schematic diagram of the gateway device 30 according to an embodiment of the present application.

As illustrated in FIG. 3, the gateway device 30 comprises a network detection circuit 31, a feedback circuit 32, and a message hijacking circuit 33. The gateway device may also incorporate additional circuits. The present disclosure is not limited thereto.

The network detection circuit 31 may be configured to perform step of S201.

Optionally, network detection circuit 31 conducts passive detection for broadband access status. For example, the gateway device 30 attempts to measure the value of broadband access status based on the type of broadband access, such as fiber, Ethernet, ADSL, Dongle. Network detection circuit 31 records its broadband access status as one of disconnected, connecting, and connected states. If the gateway device 30 supports multiple types of broadband access, network detection circuit 31 sequentially checks and records the status of each type of access. It's worth noting that the detection for broadband access status is passive, allowing the network detection circuit 31 to directly capture messages when the gateway device 30 is unable to access broadband, without the need for additional operations.

Optionally, the network detection circuit 31 conducts passive detection for connection dial-up status. For instance, after accessing broadband, the gateway device employs its built-in dialer to dial through a specific network connection, and successful dialing is a prerequisite for accessing the network provided by the service provider. The network connection methods include Bridge, DHCP, PPPOE, L2TP, and more. The network detection circuit 31 is designed to detect and record the connection dial-up status of the gateway device's current network connection as one of connection disabled, disconnected, connecting, and connected. If the gateway device supports multiple network connections, it sequentially attempts dialing and records the status of each network connection. Notably, the detection for dialing status is also passive, allowing the network detection circuit 31 to directly capture messages when the gateway device is unable to access broadband without the need for additional operations.

Optionally, following a successful dialing process, the network detection circuit 31 can acquire DNS information. Subsequently, the gateway device 30 attempts to send ICMP requests and DNS requests to the obtained DNS address, evaluating the DNS server's status based on response messages and recording the results. The availability of DNS servers may influence the stability of network connections. If DNS servers encounter issues, it may lead to network request timeouts or failures, affecting users' online experiences. Notably, the measurement for DNS server reachability is proactive. The network detection circuit 31 is equipped with a timer, periodically initiating requests to assess the reachability of DNS servers.

Optionally, following a successful dialing process, the network detection circuit 31 can acquire information about the default gateway. Thus, the network detection circuit would obtain the value of the connectivity to default gateways. Subsequently, the gateway device attempts to send ICMP requests to the obtained default gateway address, assesses the status based on response messages, and records the results. The default gateway is the primary gateway designated for forwarding packets to different networks. In a local area network, typically, there is only one default gateway, and LAN-side terminals route their data through the router to the default gateway for further forwarding, ultimately reaching the target network. If the default gateway is unavailable or configured incorrectly, LAN-side terminals within the local area network may be unable to connect to external networks, resulting in communication failures. Notably, the measurement for connectivity to default gateways is also proactive. The network detection circuit 31 is equipped with a timer, periodically initiating requests to assess the connectivity to default gateways.

Subsequently, the network detection circuit 31 is configured to perform S202. Based on the values recorded for each of the network parameters, network detection circuit 31 determines the network status. Specifically, if the value of any network parameter corresponds to "abnormal," the network detection circuit 31 determines the network status as "abnormal." Conversely, if all network parameters fall within preset ranges, indicating that broadband access status is connected, connection dial-up status is connected, DNS servers are reachable, and the default gateway is functioning properly, the network status is determined to be "normal."

Once the network detection circuit 31 determines a change in network status, such as transitioning from normal to abnormal or vice versa, it sends a status message to feedback circuit 32 and message hijacking circuit 33. This status message includes a network status identifier. Additionally, the status message may also include a field indicating restrictions on device range, meaning that only specific devices might be affected by the network status.

If the network status identifier indicates that the network status is normal, the error reason field is assigned an empty value. On the other hand, if the network status identifier indicates that the network status is abnormal, the error reason field is fulfilled with a specific network parameter identified with errors, such as "broadband access status being disconnected", "connection dial-up status being disconnected", "DNS server being unreachable", and "a failure in default gateway".

Furthermore, the network detection circuit 31 can periodically send network status information to the feedback circuit 32 and message hijacking circuit 33 to ensure timely updates and notifications.

Compared with the traditional method that only the LAN-side terminals can initiate the network state detection, the gateway device 30 of the embodiment of the present disclosure can autonomously perform proactive or passive network detection via network detection circuit 31. Compared with the LAN-side terminals, the gateway device 30 is closer to the external network, and can obtain information of the network abnormality faster. The network state detection mechanism according to the present disclosure has been described in detail with reference to FIG. 3.

Next, the combination scheme of the network state detection mechanism and the feedback mechanism according to the embodiment of the present disclosure will be described with reference to FIGS. 4 and 5, so that the LAN-side terminals can directly obtain the network state without waiting for timeout. Specifically, FIG. 4 illustrates a schematic diagram of the operation of the gateway device as the network status changes from normal to abnormal. Similarly, FIG. 5 depicts a schematic diagram of the operation of the gateway device as the network status transitions from abnormal to normal. The feedback circuit 32 and message hijacking circuit 33 collaborate to perform S203-S204.

Figure 4:
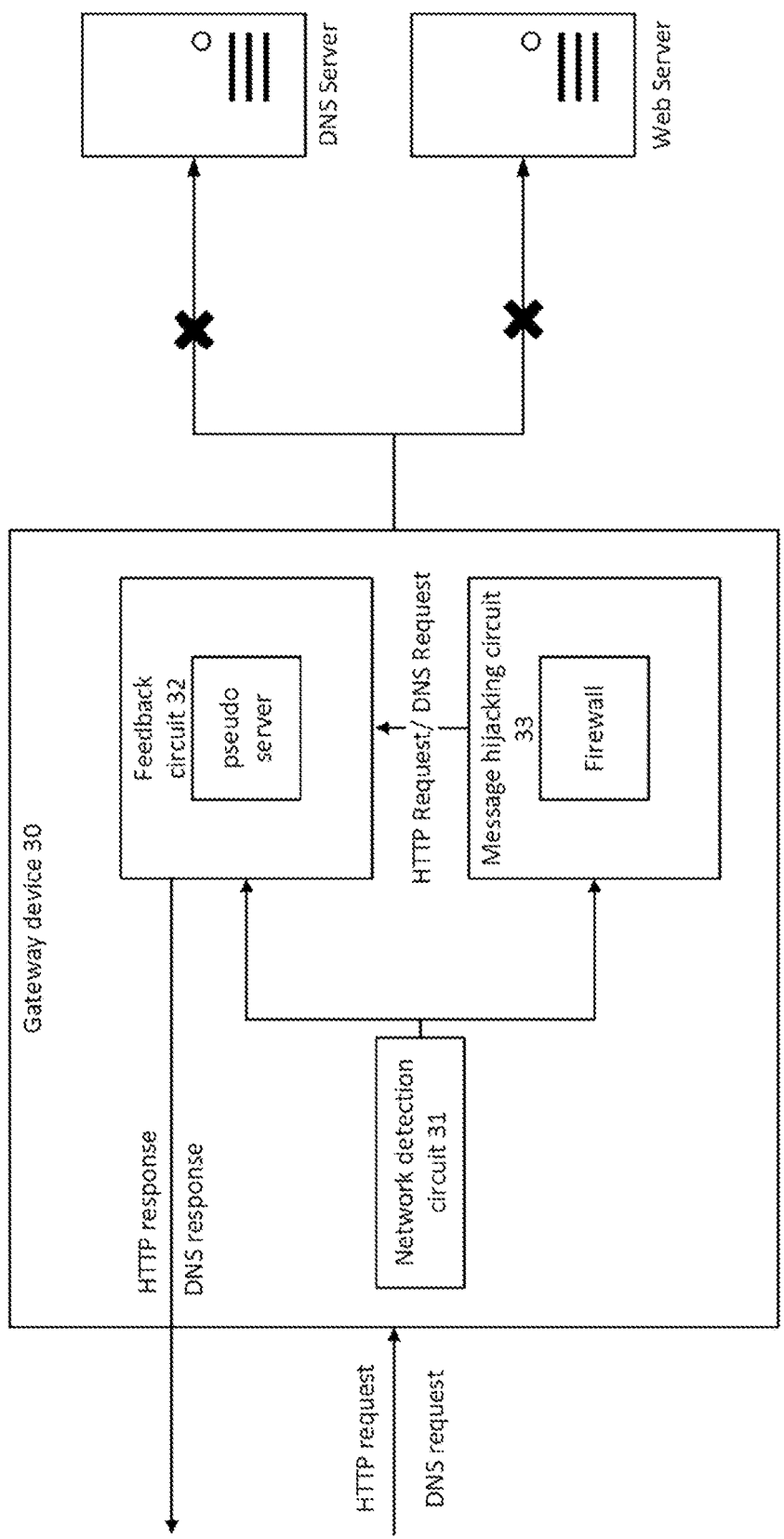
FIG. 4 illustrates another schematic diagram of the gateway device according to an embodiment of the present application.

As shown in FIG. 4, if the network detection circuit 31 detects the current gateway device transitioning from a normal state to an abnormal state, it sends a message to the feedback circuit 31. The message indicates the current network status as abnormal. The feedback circuit 32 creates an instance of pseudo server, waiting to receive specific messages and respond. Simultaneously, the network detection circuit 31 sends a message to the message hijacking circuit 33. The message contains information about the current abnormal state and optionally, information about the restricted device scope. The message hijacking circuit 33 is responsible for intercepting specified messages and redirecting them to the feedback circuit 32. This message hijacking circuit 33 continuously monitors the status information sent by the network detection circuit 31, which includes details about the abnormal state and restricted scope. It reacts accordingly to the changes in status. Specifically, the message hijacking circuit 33 determines the types of network requests of application layer that need "hijack" or "interception" based on the abnormal network state and adds corresponding message interception rules for message hijacking.

In response to feedback circuit 31 receiving a status message indicating an abnormal network state, feedback circuit 32 creates an instance of the pseudo server. The purpose of this pseudo server is to act as a substitute for a DNS server and a web server. The pseudo server receives and processes messages such as HTTP and DNS requests, and based on the current abnormal state, constructs corresponding feedback messages as network response of the application layer. These feedback messages are then stored within the pseudo server. The pseudo server may have any legal IP address, as long as this IP address differs from the IP addresses in the internal DNS cache of the gateway device.

In response to the message hijacking circuit 33 receiving a status message indicating an abnormal network state, the message hijacking circuit 33 deploys corresponding redirect rules in internal firewall. These rules involve "hijack" or "intercepting" interaction network requests of application layer from specified LAN-side terminals when accessing the Internet. The "hijacked" or "intercepted" messages include HTTP GET/POST and DNS Request messages. To achieve this, custom TARGET is added to iptables, and the TARGET take effect in the PREROUTING chain of the NAT table. This configuration enables the rapid filtering of specified message types, redirecting them to the feedback circuit 31. Additionally, these rules can be customized to apply only to specific device ranges according to specific requirements. They can also be extended to accommodate custom message types, providing flexibility for future expansions.

For example, iptables and chains are components of the netfilter framework in the Linux system. Message hijacking circuit 33 may set iptables rules for interception. The NAT table's PREROUTING chain specifically takes effect when there is DNAT (Destination Network Address Translation) conversion in the packet's transmission process. An example iptables rule for this scenario could be "iptables-t nat-A PREROUTING-i lan-p tcp-dport 53-j MYTARGET." This rule intercepts DNS requests from the LAN side and directs them to MYTARGET (i.e. the instance name of the pseudo server) for further processing in the feedback circuit 32.

Specifically, if the message hijacking circuit 33 receives an HTTP GET/POST message from a LAN-side terminal, it redirects the network request of application layer to the pseudo server within the message hijacking circuit 33. The pseudo server parses the message, retrieves its IP address, determines the corresponding abnormal status and prompt information based on the current state, formulates an HTTP response message, and sends the response back to the client.

In the case of receiving a DNS Request message from a LAN-side terminal, the message hijacking circuit 33 redirects the message to the server. The pseudo server parses the message, retrieves its IP address and domain information, and uses the IP address of the pseudo server to construct an appropriate DNS Reply message for reply. Using the IP address of the pseudo server is beneficial. When attempting to access the Internet by domain name, the LAN-side terminals may consistently initiate DNS resolution for its subsequent HTTP interactions. If the DNS server is unreachable, they would be unable to obtain resolution results, preventing subsequent HTTP interactions and feedback on the status information. Thus, using the IP address of the pseudo server as the result of DNS resolution can prevent LAN-side terminals from continuous attempts, especially in the case where the DNS server is unreachable.

Additionally, if the current gateway device experiences a change in abnormal status (for example, transitioning from an unreachable DNS server to a dial-up failure), the network detection circuit 31 sends new abnormal status information to the feedback circuit 32. The feedback circuit 32 updates the configuration of its pseudo server to modify the feedback content. Simultaneously, the network detection circuit 31 sends new abnormal status information and restricted scope information to the message hijacking circuit, which then updates its message interception rules. This disclosure is not limited to these actions.

Figure 5:
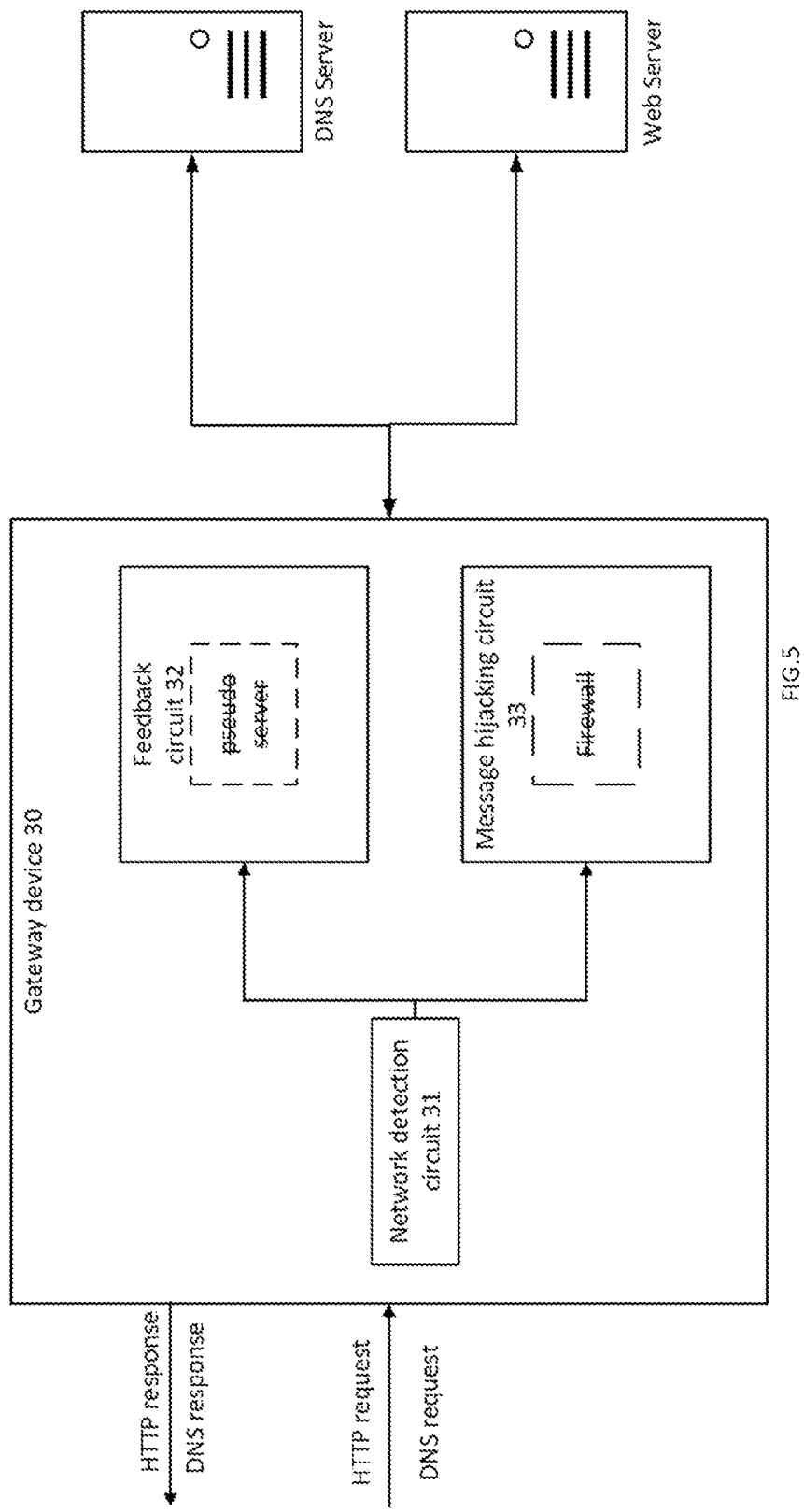
FIG. 5 illustrates another schematic diagram of the gateway device according to an embodiment of the present application.

As depicted in FIG. 5, if the network detection circuit 31 detects that the current gateway device has transitioned from an abnormal state to a normal state, it sends a message to the feedback circuit 31 indicating that the current network status has returned to normal. The feedback module then removes the corresponding instance of the pseudo server. Simultaneously, the network detection circuit 31 sends a message to the message hijacking circuit 33, indicating that the current network status has returned to normal. The message hijacking circuit 33, in turn, deletes the relevant message interception rules as the network status has returned to normal.

Through this mechanism, the gateway device can update the current network status in real-time. By configuring the feedback circuit 32 and the message hijacking circuit 33, it accurately intercepts specified messages and provides correct abnormal status information and prompts when the gateway device is in an abnormal state.

Therefore, when the gateway device detects that it is in an abnormal state and LAN-side clients attempt to access the Internet, they will first send DNS Request messages for domain name resolution. These messages will be intercepted by the feedback device and return resolution addresses of the pseudo server. Based on the obtained resolution address, LAN devices will issue HTTP GET/POST messages in an attempt to retrieve pages. These messages will also be intercepted by the feedback circuit 32, which returns abnormal status information as a result to LAN devices.

For LAN-side clients, when accessing the Internet through HTTP or similar means, they can receive correct pages if the network status is normal. In the case of abnormal network status, they can quickly obtain pages containing abnormal status information and prompts. In this way, the gateway device can promptly determine the current network status.

Figure 6:
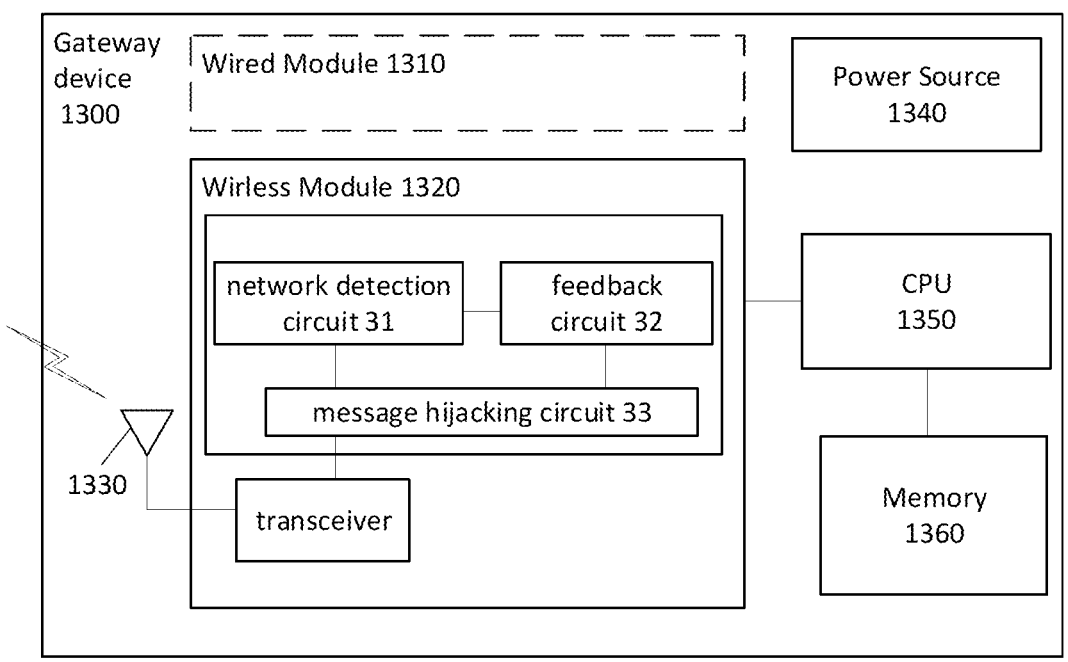
FIG. 6 shows an example configuration of a communication device, for example a gateway device, according to an embodiment of the present disclosure.

Further, FIG. 6 shows an example configuration of a communication device 1300, for example a gateway device, according to an embodiment of the present disclosure. The communication device 1300 may include a Wired circuit 1310 (optional), a Wireless circuit 1320, at least one antenna 1330 (for the sake of simplicity, only one antenna is shown in FIG. 7), a power source 1340, a central processing unit (CPU) 1350 and at least one memory 1360. The Wireless circuit 1320 may further comprise an application layer and a transceiver. The application layer can comprise a network detection circuit 31, a feedback circuit 32, and a message hijacking circuit 33. The transceiver can be used to establish a link and transmit/receive signal over a channel of the link via the antenna 1330. The Wireless circuit 1320 and the CPU 1350 may function together as a circuit of the communication device 1300 configured to perform methods (e.g., method 20) as described in the present disclosure. It should be understood that the configuration of the communication device (e.g., gateway device) shown in FIG. 6 is merely as example, but not a limitation. The configuration of the communication device (e.g., gateway device) in the present disclosure can comprise more or less components than those in FIG. 6.

According to another aspect of the present disclosure, there is provided a computer-readable storage medium for storing a computer-readable program, the program causing a computer to perform the method for wireless communication as described above.

It is noted that one or more blocks (or operations) described with reference to FIG. 2 may be combined with one or more blocks (or operations) described with reference to another of the figures. For example, one or more blocks (or operations) of FIG. 2 may be combined with one or more blocks (or operations) of FIGS. 3-5. As another example, one or more blocks associated with FIGS. 3-5 may be combined with one or more blocks (or operations) associated with FIG. 2.

Techniques for wireless communication may include additional aspects, such as any single aspect or any combination of aspects described below and/or in connection with one or more other processes described elsewhere herein.

In a first aspect, a gateway device for wireless communication, comprising: a memory; and one or more processors operatively coupled to the memory, the one or more processors configured to: perform network state detection; determine a network state based on the result of network state detection; receive a network request of application layer; and transmit a network response of the application layer based on the network state.

In a second aspect, alone or in combination with any other aspect, when performing network state detection, the one or more processors is configured to: perform measurement for the value of at least one network parameter; and determine a result of network state detection based on the measurement; wherein the at least one network parameter includes at least one of: broadband access status, connection dial-up status, DNS server reachability, connectivity to default gateways, and custom defined exceptions.

In a third aspect, alone or in combination with any other aspect, the network request of application layer includes DNS request and HTTP request; the network response of the application layer includes DNS response and HTTP response.

In a fourth aspect, alone or in combination with any other aspect, when transmitting a network response of the application layer based on the network state, the one or more processors is configured to: in response to the network status being determined as normal, forward the network response of the application layer from a DNS server or a web server; in response to the network status being determined as abnormal, transmit the network response of the application layer from an instance of pseudo server of the gateway device.

In a fifth aspect, alone or in combination with any other aspect, wherein the network response of the application layer from the instance of pseudo server includes an indicator of abnormal network status and indicates at least one of: broadband access status being disconnected, connection dial-up status being disconnected, DNS server being unreachable, or a failure in default gateway.

In a sixth aspect, alone or in combination with any other aspect, when transmitting the network response of the application layer from a pseudo server of the gateway device, the one or more processors is configured to: in response to the network status transitioning from a normal state to an abnormal state, create the instance of pseudo server; deploy routing rules for redirecting the network request of application layer to the instance of pseudo server; and transmit the network response of the application layer from the instance of pseudo server of the gateway device.

In an seventh aspect, alone or in combination with any other aspect, when forwarding the network response of the application layer from a DNS server or a web server, the one or more processors is configured to: in response to the network status transitioning from an abnormal state to a normal state, delete the instance of pseudo server; delete the redirect rules (which also referred as filtering rules or firewall rules) for redirecting the network request of application layer to the instance of pseudo server; and forward the network response of the application layer from the DNS server or the web server.

In an eighth aspect, alone or in combination with any other aspect, when transmitting the network response of the application layer from a pseudo server of the gateway device, the gateway device is configured to: parse the network request of the application layer, and determine a type of the network response of the application layer; in response to the type of the network request of the application layer being HTTP GET/POST message, transmit a HTTP response with indicator of abnormal network status.

In a ninth aspect, alone or in combination with any other aspect, transmitting the network response of the application layer from a pseudo server of the gateway device, the gateway device is configured to: parse the network request of the application layer, and determine a type of the network response of the application layer; in response to the type of the network request of the application layer being DNS request, transmit a DNS response with IP address of the instance of pseudo server.

In an tenth aspect, a terminal for wireless communication, configured to: transmit a network request of application layer; and receive a network response of the application layer with an indicator of abnormal network status, the network response indicates at least one of: broadband access status being disconnected, connection dial-up status being disconnected, DNS server being unreachable, or a failure in default gateway.

In a eleventh aspect, alone or in combination with any other aspect, in response to the type of the network request of the application layer being DNS request, receive a DNS response with IP address of a pseudo server of a gateway device.

In a twelfth aspect, alone or in combination with any other aspect, in response to the type of the network request of the application layer being HTTP GET/POST message, receive a HTTP response with indicator of abnormal network status.

Those of skill would appreciate that the logical blocks, circuits, and algorithm steps described here may be implemented as electronic hardware, computer software, or a combination. This interchangeability of hardware and software is shown by the illustrative components described functionally. Whether the functionality is implemented in hardware or software depends on the application and constraints. Experts may implement the functionality in various ways for each application, but those choices do not depart from the scope here. Experts also recognize the examples of components, methods, and interactions here are merely illustrative; the components, methods, or interactions may be combined or performed differently.

The illustrative logic, blocks, circuits, and processes described may be implemented as hardware, software, or a combination. This hardware and software interchangeability has been described generally in terms of functionality and illustrated in the components, blocks, circuits, and processes. Whether the functionality is implemented in hardware or software depends on the application and constraints.

In an embodiment of the present disclosure, the processor may be a logic computing device with data processing capabilities and/or program execution capabilities, such as a central processing unit (CPU), a field programmable logic array (FPGA), a single chip microcomputer (MCU), a digital signal processor (DSP), an application specific integrated circuit (ASIC), or the like. The memory may be, for example, a volatile memory and/or a non-volatile memory. The volatile memory may include, for example, a random access memory (RAM) and/or a cache (Cache) or the like. The non-volatile memory may include, for example, a read only memory (ROM), a mechanical hard disk (HDD), a solid state drive (SSD), a flash memory (Flash), a USB flash drive, a memory card (SD, CF, MicroSD, etc.), and the like.

It will be appreciated by a person skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "data block", "circuit", "engine", "unit," "circuit," or "system". Furthermore, aspects of the present disclosure may take the form of a computer program product embodied in one or more computer-readable media having computer-readable program code embodied thereon.

Certain terminology has been used to describe embodiments of the present disclosure. For example, the terms "first/second embodiment", "one embodiment", "an embodiment", and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

The invention claimed is:

1. A method for wireless communication performed by gateway device, comprising:
   performing network state detection;
   determining a network state based on a result of network state detection;
   receiving, from LAN-side terminal, a network request of application layer; and
   transmitting, to the LAN-side terminal, a network response of application layer based on the network state,
   wherein the transmitting to the LAN-side terminal a network response of application layer based on the network state comprises:
   in response to the network status being determined as normal, forwarding the network response of application layer from a DNS server or a web server;
   in response to the network status being determined as abnormal, transmitting the network response of application layer from an instance of pseudo server of the gateway device.

2. The method according to claim 1, wherein the performing network state detection comprises:
   performing measurement for at least one network parameter; and
   determining a result of network state detection based on the measurement;
   wherein the at least one network parameter includes at least one of: broadband access status, connection dial-up status, DNS server reachability, connectivity to default gateways, and custom defined exceptions.

3. The method according to claim 2, wherein,
   the network request of application layer includes a DNS request and a HTTP request;
   the network response of application layer includes a DNS response and a HTTP response.

4. The method according to claim 1, wherein the network response of application layer from the instance of pseudo server of the gateway device includes an indicator of abnormal network status and indicates at least one of:
   broadband access status being disconnected,
   connection dial-up status being disconnected,
   DNS server being unreachable, or
   a failure in default gateway.

5. The method according to claim 1, wherein the transmitting the network response of the application layer from the instance of pseudo server of the gateway device comprises:
   in response to the network status transitioning from a normal state to an abnormal state, creating the instance of pseudo server of the gateway device;

deploying redirect rules for redirecting the network request of application layer to the instance of pseudo server of the gateway device; and transmitting the network response of application layer from the instance of pseudo server of the gateway device.

6. The method according to claim 1, wherein the forwarding the network response of the application layer from a DNS server or a web server comprises:

in response to the network status transitioning from an abnormal state to a normal state, deleting the instance of pseudo server of the gateway device;

deleting the redirect rules for redirecting the network request of application layer to the instance of pseudo server of the gateway device; and forwarding the network response of application layer from the DNS server or the web server.

7. The method according to claim 5, wherein the transmitting the network response of application layer from the instance of pseudo server of the gateway device comprises:

parsing the network request of application layer, and determining a type of the network request of application layer;

in response to the type of the network request of application layer being HTTP GET/POST message, transmitting a HTTP response with the indicator of abnormal network status.

8. The method according to claim 5, wherein the transmitting the network response of the application layer from the instance of pseudo server of the gateway device comprises:

parsing the network request of application layer, and determining a type of the network request of application layer;

in response to the type of the network request of application layer being DNS request, transmitting a DNS response with IP address of the instance of pseudo server of the gateway device.

9. A gateway device for wireless communication, comprising:

a memory; and one or more processors operatively coupled to the memory, the one or more processors configured to:

perform network state detection;

determine a network state based on the result of network state detection;

receive, from LAN-side terminal, a network request of application layer; and transmit, to LAN-side terminal, a network response of the application layer based on the network state, wherein when transmitting to LAN-side terminal a network response of application layer based on the network state, the one or more processors is configured to:

in response to the network status being determined as normal, forward the network response of application layer from a DNS server or a web server;

in response to the network status being determined as abnormal, transmit the network response of application layer from an instance of pseudo server of the gateway device.

10. The gateway device according to claim 9, wherein when performing network state detection, the one or more processors is configured to:

perform measurement for the value of at least one network parameter; and determine a result of network state detection based on the measurement;

wherein the at least one network parameter includes at least one of: broadband access status, connection dial-up status, DNS server reachability, connectivity to default gateways, and custom defined exceptions.

11. The gateway device according to claim 10, wherein, the network request of application layer includes a DNS request and a HTTP request;

the network response of application layer includes a DNS response and a HTTP response.

12. The gateway device according to claim 9, wherein the network response of application layer from the instance of pseudo server of the gateway device includes an indicator of abnormal network status and indicates at least one of:

broadband access status being disconnected, connection dial-up status being disconnected, DNS server being unreachable, or a failure in default gateway.

13. The gateway device according to claim 9, wherein when transmitting the network response of the application layer from the instance of pseudo server of the gateway device, the one or more processors is configured to:

in response to the network status transitioning from a normal state to an abnormal state, create the instance of pseudo server of the gateway device;

deploy redirect rules for redirecting the network request of application layer to the instance of pseudo server of the gateway device; and transmit the network response of application layer from the instance of pseudo server of the gateway device.

14. The gateway device according to claim 9, wherein when forwarding the network response of the application layer from a DNS server or a web server, the one or more processors is configured to:

in response to the network status transitioning from an abnormal state to a normal state, delete the instance of pseudo server of the gateway device;

delete the redirect rules for redirecting the network request of application layer to the instance of pseudo server of the gateway device; and forward the network response of application layer from the DNS server or the web server.

15. The gateway device according to claim 9, when transmitting the network response of application layer from the instance of pseudo server of the gateway device, the gateway device is configured to:

parse the network request of application layer, and determine a type of the network response of application layer;

in response to the type of the network request of application layer being HTTP GET/POST message, transmit a HTTP response with the indicator of abnormal network status.

16. The gateway device according to claim 9, when the transmitting the network response of the application layer from the instance of pseudo server of the gateway device, the gateway device is configured to:

parse the network request of application layer, and determine a type of the network response of application layer;

in response to the type of the network request of application layer being DNS request, transmit a DNS response with IP address of the instance of pseudo server of the gateway device.

17. A computer-readable storage medium is provided, which has stored thereon computer programs which, when executed by the processor, cause the processor to perform:
- performing network state detection;
- determining a network state based on a result of network state detection;
- receiving, from LAN-side terminal, a network request of application layer; and
- transmitting, to LAN-side terminal, a network response of application layer based on the network state,
- wherein the transmitting to the LAN-side terminal a network response of application layer based on the network state comprises:
- in response to the network status being determined as normal, forwarding the network response of application layer from a DNS server or a web server;
- in response to the network status being determined as abnormal, transmitting the network response of application layer from an instance of pseudo server of the gateway device.

* * * * *